No. 797,634. PATENTED AUG. 22, 1905.
H. TAYLOR.
COMBINED JUG AND TESTER FOR MILK, &c.
APPLICATION FILED NOV. 12, 1904.
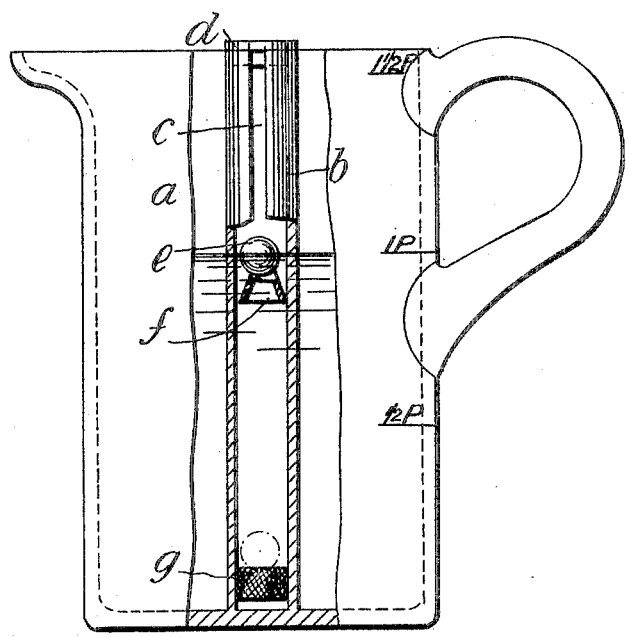
Witnesses.
Inventor. Herbert Taylor
by his Attorney.

UNITED STATES PATENT OFFICE.

HERBERT TAYLOR, OF PORTSMOUTH, ENGLAND.

COMBINED JUG AND TESTER FOR MILK, &c.

No. 797,634. Specification of Letters Patent. Patented Aug. 22, 1905.

Application filed November 12, 1904. Serial No. 232,427.

*To all whom it may concern:*

Be it known that I, HERBERT TAYLOR, a subject of the King of Great Britain and Ireland, and a resident of Kingston Cross, Portsmouth, county of Hants, England, have invented a certain new and useful Improved Combined Jug and Tester for Milk and other Liquids, of which the following is a specification.

This invention relates to an improved combined jug and tester for various liquids, but more especially for milk, so that on purchasing, say, milk at the door the purchaser can determine whether he is receiving the genuine or adulterated article.

In carrying my invention into effect I form the jug of glass and of an upright or vertical shape, as shown in the accompanying drawing, which represents my improved jug and tester in sectional elevation. The jug $a$ I form interior with an attachment in the form of a vertical cylinder $b$, extending from top to bottom of the jug and provided with a vertical slot $c$ or, if desired, with a series of perforations for the passage of the liquid and provided at top with a closure $d$. Inside said cylinder $b$ is arranged to rise and fall a ball or float $e$, provided with a downwardly-extending dished tail or cone $f$, hollow and perforated, if desired, and of such a size as to prevent the said ball or float $e$ from turning turtle from some cause or other and falling to the bottom, and thus giving an incorrect record.

To prevent the tail of the ball or float being injured through falling, I arrange in any suitable manner within the cylinder $b$ a gauze or like basket $g$, adapted to receive said ball in its fall, and so prevent breakage.

By suitably marking the jug the ball may be used not only to test as to quality, but also as to quantity.

What I claim, and desire to secure by Letters Patent of the United States, is—

In a liquid-tester, a jug provided therein with a longitudinally-arranged float-guiding cylinder $b$ having in the side thereof a longitudinally-disposed slot, a closure fitting the open upper end of said cylinder, a foraminous basket removably fitted inside of the cylinder at the lower end thereof, and a float-body arranged within the cylinder and provided at its lower side with a hollow conical tail portion $f$.

In testimony whereof I have affixed my signature in presence of two witnesses.

HERBERT TAYLOR.

Witnesses:
 J. MAIN,
 A. J. WHITTEM.